United States Patent Office 2,767,548
Patented Oct. 23, 1956

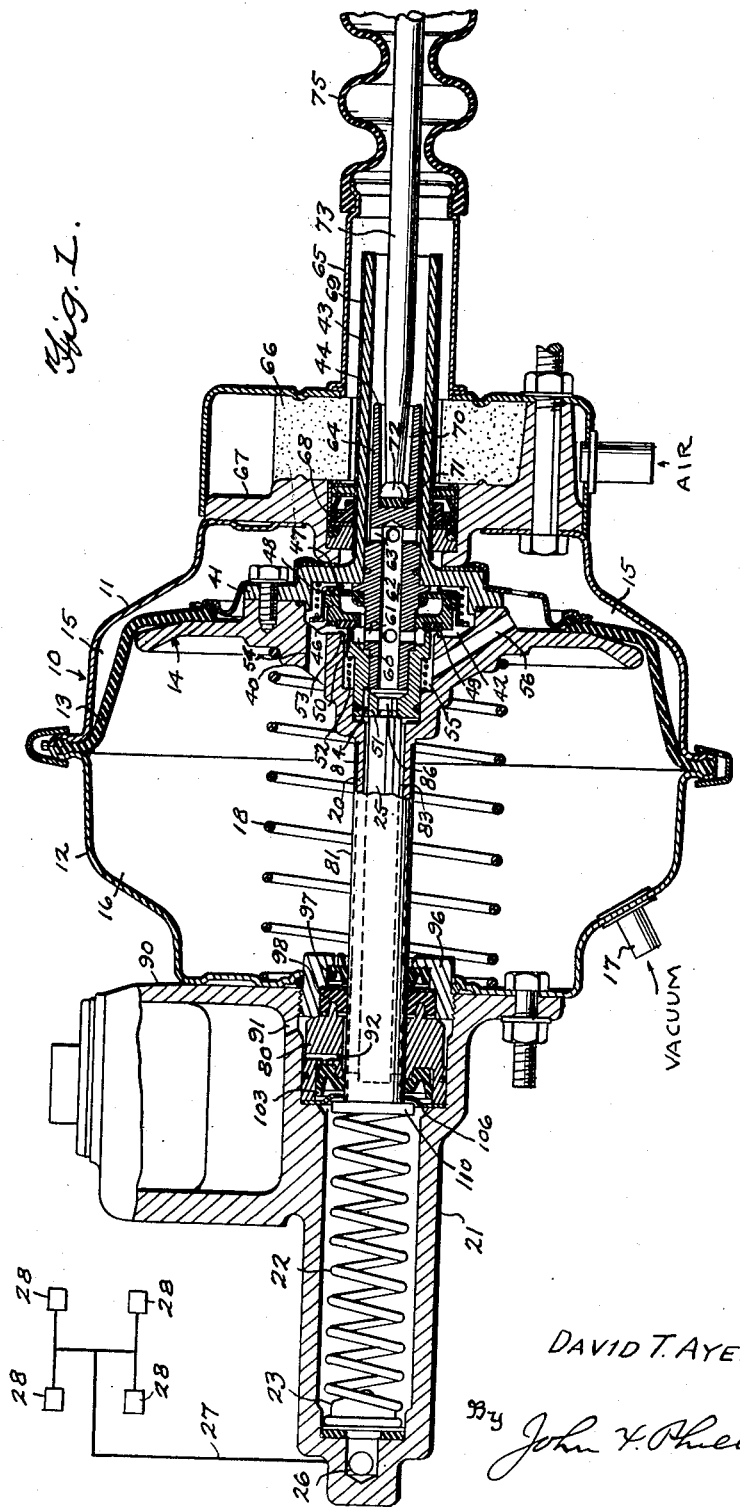

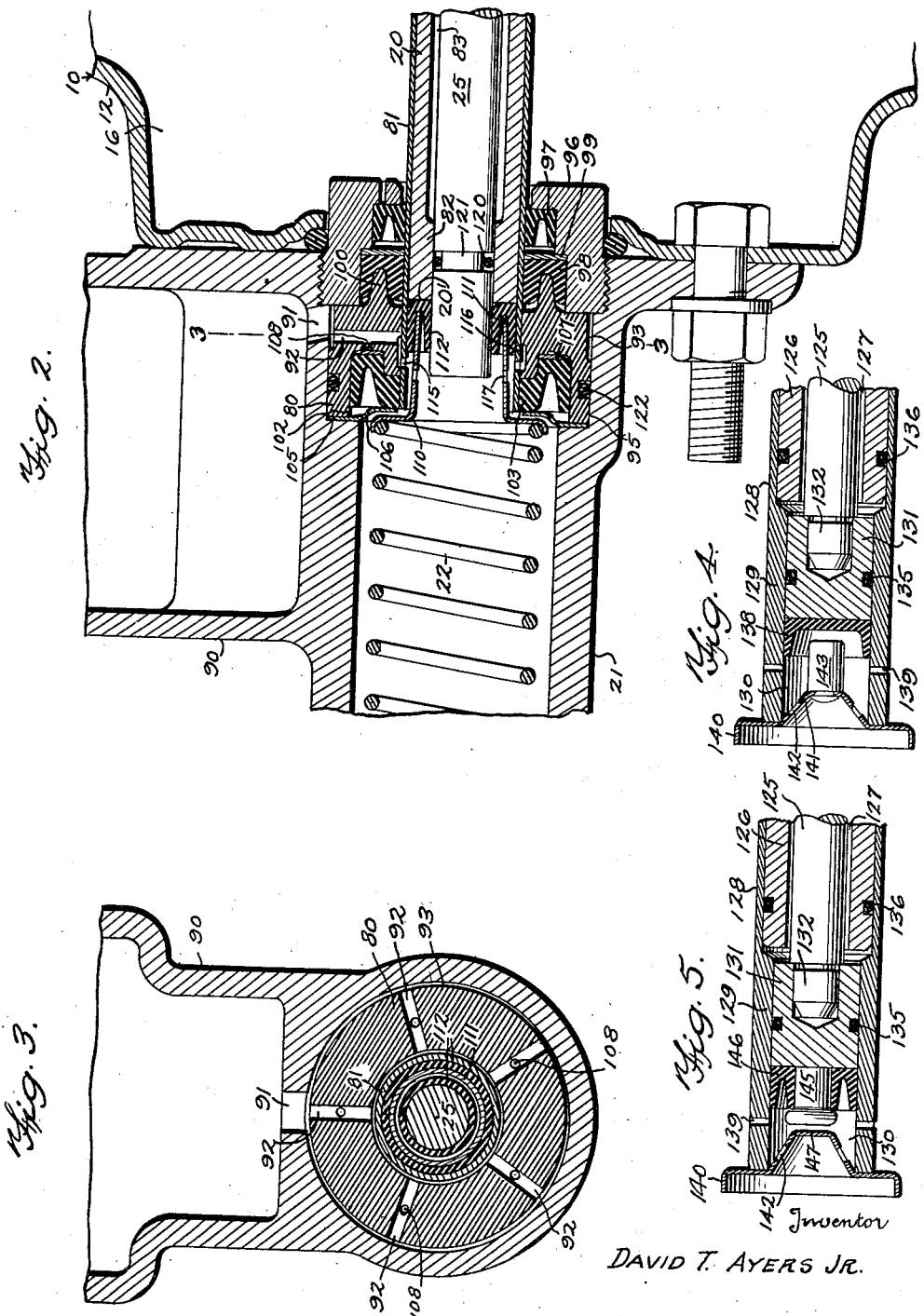

2,767,548
MASTER CYLINDER STRUCTURE FOR BOOSTER BRAKE MECHANISMS

David T. Ayers, Jr., Birmingham, Mich., assignor to Kelsey Hayes Wheel Company, Detroit, Mich., a corporation of Delaware Application November 3, 1952, Serial No. 318,495

17 Claims. (Cl. 60—54.6)

This invention relates to a booster brake mechanism, and particularly to such a mechanism for use on motor vehicles.

Booster brakes for the braking systems of motor vehicles have been constantly improved over a period of years and have attained a relatively high degree of efficiency in operation. For a number of years after such devices came into use, motor vehicle manufacturers were reluctant to eliminate the conventional master cylinders, which were pedal-operated to displace hydraulic fluid into the brake lines to apply the brakes. Earlier booster brake mechanisms therefore were connected in the lines between the master cylinders and the brake cylinders. Upon operation of the foot pedal, fluid would be displaced from the master cylinder into a low pressure cylinder of the booster, and such fluid would operate plunger means for generating pressure in and displacing fluid from a high pressure chamber into the brake lines. The fluid entering the low pressure chamber would also operate a valve mechanism to energize a booster motor to assist in displacing fluid from the high pressure chamber.

As booster mechanisms for hydraulic brake mechanisms have come into more common acceptance by the industry and by the public, the motor vehicle industry is now accepting the idea of eliminating the conventional master cylinders and utilizing the high pressure chambers of the booster mechanisms in a manner similar to the use of master cylinders, reservoirs being connected therewith to replenish any fluid losses from the system.

Such embodiment of a reservoir in conjunction with the high pressure chamber of a booster mechanism has introduced additional problems in the introduction of replenishing liquid to the system and the sealing of the parts against leakage, although some of the leakage problems were common to earlier types of booster mechanisms.

An important object of the present invention is to provide a novel booster brake mechanism having a high pressure cylinder which acts as a master cylinder and to provide improved means for supplying fluid to the high pressure cylinder to replenish fluid which may have leaked from the system.

A further object is to provide such a device which functions upon a rapid return stroke of the high pressure fluid displacing means and before such means reaches an "off" position to supply hydraulic liquid to the high pressure cylinder if the pressure therein drops below a predetermined point, thus preventing the creation of a partial vacuum and the possible sucking of air into the high pressure chamber to disturb the normal functioning of the apparatus.

A further object is to provide such a mechanism which provides for direct communication between the high pressure cylinder and the reservoir when the fluid displacing means is in the fully "off" position, thus providing for the replenishing of any leakage fluid from the system and also providing for the returning to the reservoir of any excess liquid in the high pressure cylinder if such liquid has been admitted thereto during rapid movement of the liquid displacing means toward "off" position, thus rendering it impossible for such excess liquid to prevent the return to the high pressure cylinder of the necessary amount of liquid from the brake lines to insure the full releasing of the brakes.

A further object is to provide, in conjunction with the mechanism referred to, a novel "live" sealing means between the manually operated and power operated plunger means which coact to displace fluid from the high pressure cylinder, such sealing means being arranged between the plunger means referred to and subject to such slight relative movement therebetween as to greatly lengthen the life of the sealing means referred to.

A further object is to provide such a sealing means for use in connection with a vacuum operated booster motor mechanism wherein air at atmospheric pressure from the source providing the high pressure source for operation of the motor is maintained at all times between the manually operated plunger and the power operated plunger up to a point in relatively close proximity to the sealing means referred to, thus preventing the creation of a vacuum which would tend to cause leakage between the two plungers.

A further object is to provide a novel type of combined manually and power operated plunger means wherein, without changing the basic unit, the minor parts can be selectively used in accordance with the desired ratio between the work performed by the foot of the operator and the work performed by the booster motor.

Other objects and advantages of the invention will become apparent during the course of the following description.

In the drawing I have shown several embodiments of the invention. In this showing:

Figure 1 is a longitudinal sectional view through the booster mechanism showing a portion of the manually operable rod and diagrammatically illustrating the connection of the high pressure booster cylinder to the wheel cylinders;

Figure 2 is a substantially enlarged fragmentary sectional view, corresponding to Figure 1, showing a portion of the high pressure cylinder and associated elements;

Figure 3 is a section on line 3—3 of Figure 2;

Figure 4 is a fragmentary sectional view of a modified type of plunger means, corersponding to the left-hand end of the plunger means in Figure 2, showing a construction which is adapted to provide for different ratios between the work performed by the foot of the operator and the work performed by the booster motor; and Figure 5 is a similar view showing a modified form of the same.

A booster brake mechanism constructed substantially in accordance with Figure 1 is disclosed in the copending application of Jeannot G. Ingres, Serial No. 286,081, filed May 5, 1952, but forms no part of the invention claimed in such application. The particular type of valve mechanism for energizing the booster motor in Figure 1 forms no part, per se, of the present invention but is disclosed and claimed in my copending application Serial No. 318,497, filed November 3, 1952.

The booster mechanism comprises a motor indicated as a whole by the numeral 10 and including preferably stamped casing sections 11 and 12 having clamped therebetween the peripheral portion of a flexible diaphragm 13. This diaphragm forms part of the pressure responsive unit of the motor, which unit is indicated as a whole by the numeral 14 and forms with the casing sections a pair of chambers 15 and 16, respectively.

The motor, in accordance with common practice, utilizes the vacuum of the intake manifold of the vehicle engine as a source of differential pressure, and it will become apparent that the motor chamber 16 is constantly connected to the source of vacuum and is accordingly a constant pressure chamber. The chamber 15 is connectable in a manner to be described to a source of high pressure, namely, the atmosphere. The chamber 16 is connected to an intake manifold line through a suitable fitting 17. A conventional return spring 18 tends to hold the pressure responsive unit 14 in the normal or "off" position, under which conditions the valve mechanism to be described connects the chambers 15 and 16 with each other so that the unit 14 is vacuum suspended.

The unit 14 includes a sleeve 20 extending into a high pressure cylinder 21, and this sleeve is biased to "off" position by a spring 22 arranged in the cylinder 21 and associated with a conventional residual pressure valve 23, which may be of any desired type. A manually operable plunger 25 is slidable within the sleeve 20 and cooperates therewith to displace hydraulic fluid from the cylinder 21, such flluid flowing through an outlet 26 through pipe lines 27 to the brake cylinders 28. The valve mechanism for energizing the motor 10, as stated above, forms no part, per se, of the present invention but is disclosed and claimed in my copending application Serial No. 318,497 referred to above. Therefore the valve mechanism need not be described herein in detail. The body of the pressure responsive unit 14 includes a housing 40, and a plate 41 is fixed thereto and cooperates therewith to form a chamber 42. An extension 43, preferably integral with the plate 41, extends axially thereof, away from the sleeve 20, and slidably receives a plunger 44 which transmits movement to the plunger 25, as described below. The valve mechanism for the motor is carried by the plunger 44 and comprises a valve body 46 flexibly connected as at 47 to the plunger 44, and is urged to the right as viewed in Figure 1 by a spring 48. A resilient valve element 49 normally engages a seat 50 when the parts are in the "off" position shown in Figure 1. The seat 50 is annular, as will be apparent, and is formed on a sleeve 51 manually movable by the plunger 44 and engaging the plunger 25 to impart movement thereto. Upon movement of the sleeve 51 to the left against the tension of a spring 52, the seat 50 moves to the left with the valve element 49 and the latter, in such movement, comes into engagement with a seat 53 formed on the casting or housing 40.

A passage 54 provides fixed communication between the motor chamber 16 and the valve chamber 42, and vacuum therefore always exists in the latter chamber. The chamber 42 communicates with an annular space 55 when the parts are in the "off" position shown in Figure 1. The space 55 is in fixed communication through a passage 56 with the motor chamber 15. Thus, the motor is normally vacuum suspended.

An annular chamber 60 is formed within the valve seat 50 for communication through radial ports 61 with an axial bore 62 extending through the greater portion of the length of the plunger 44. The bore 62 communicates through radial passages 63 with an annular space 64 formed around the right-hand end of the plunger 44. The right-hand end of the space 64 opens into the interior of the sleeve 43 and into a surrounding sleeve 65 to the interior of which air is supplied by a conventional air cleaner 66, a part of which is formed as a casting 67 fixed to the motor casing section 11 and sealed as at 68 for the prevention of leakage of air from the air cleaner to the left into the motor casing 11. Surrounding and preferably forming a part of the sleeve 43 and operating in the seal 68 is a stainless steel sleeve 69 pressed into position on the sleeve 43.

A deep axial recess 70 is formed in the right-hand end of the plunger 44 and has in the bottom thereof a resilient washer 71 engaged by a head 72 formed on the end of a push rod 73. This rod forms the manually operable element of the apparatus and, as will be understood, this rod has mechanical connection with the brake pedal of the motor vehicle to be operated thereby. The resilient washer 71 forms means for transmitting motion from the rod 73 to the plunger 44 while permitting the rod 73 to rock in accordance with the movement of the pivot which connects it to the brake pedal of the vehicle. The rod 73 is preferably surrounded by a sealing boot 75 connected at one end to the sleeve 65, as shown in Figure 1.

The casting of the high pressure cylinder 21 carries a bearing 80 in which the sleeve 20 operates. As more clearly shown in Figure 2, the sleeve 20 is surrounded by a pressed-on sleeve 81, preferably formed of stainless steel. The use of this sleeve has been found highly advantageous because of its inherent smoothness, and the left-hand end of the sleeve 81 serves an additional function referred to below. The sleeve 81 obviously is fixed to and forms a part of the sleeve 20. The sleeves 20 and 81 constitute a sleeve structure surrounding the rod 25.

Adjacent its left-hand end, the sleeve 20 is provided with a bearing portion 82 in which the rod 25 is slidable. To the right of this bearing portion, and extending to the right-hand extremity of the rod 25, as shown in Figure 1, is an annular space 83, and this space is in fixed communication with the axial passage 62 (Figure 1) through a port 84 formed in the sleeve 51. Since the passage 62 is always in communication with the atmosphere, it will be apparen tthat atmospheric pressure is always present in the annular space 83. Thus, no vacuum can ever exist in this space to tend to induce leakage around the plunger 25 from the high pressure cylinder. The rod 25, as stated, slides at one end in the bearing 82 and the other end of this rod is headed, as at 86, for connection with the sleeve 51 to be supported thereby axially within the sleeve 20.

Preferably integral with the high pressure cylinder 21 is a brake liquid reservoir 90, provided in the bottom thereof with a fluid outlet opening 91 communicating with a radial passage 92 through the bearing 80, this bearing preferably being provided therearound and communicating with the port 91 with an annular groove 90. The bearing 80 is arranged in an axial recess 95 formed in the casting of the high pressure cylinder 21 and retained in position by a sleeve nut 96. This nut contains an inner seal 97 and an outer seal 98, both surrounding the plunger sleeve 81 and the seal 98 being backed up by a washer 99. The seals 97 and 98 are annular double-lipped seals, and the bearing 80 is provided on its inner end with an annular rib 100 seating in the seal 98 to retain it in position.

The bearing 80 at its left-hand end, as viewed in Figure 2, is provided with an annular recess 102 in which is arranged a double-lipped seal 103, the outer lip of which engages in the outer wall of the recess 102 and the inner lip of which is in slidable engagement with the projecting end of the plunger sleeve 81, which projecting portion is further referred to below.

The seal 103 is retained in position by a stamped sheetmetal retainer 105 having apertures 106. The base of the seal 103 is backed up by a sheetmetal washer 107 and the bottom of the recess 102 communicates with the passage 92 through a small passage 108 and when the pressure in the high pressure cylinder, upon a rapid return stroke of the plungers 20 and 25, drops below that of the atmosphere, the liquid in the passage 92 and port 108, at atmospheric pressure, acts against the washer 107 to deform the seal 103 for the flow of fluid around the outer lip of this seal and through apertures 106 into the high pressure cylinder.

The spring 22 at its inner end engages a sheetmetal seat 110 having an axially projecting portion 111 engaging within a double-lipped seal 112. Particular attention is invited to the fact that seals corresponding to the seal 112 previously have been arranged around the plunger 25 with their outer lips engaging a stationary bearing for the power operated plunger sleeve corresponding to sleeve 20. This seal, accordingly, was subject to very substantial wear. In the present instance, the sleeve 81, preferably formed of stainless steel, projects quite substantially beyond the sleeve 20 and the sleeve 81, plunger 25, and the left-hand end of the sleeve 20 (which forms a shoulder 20') define a pocket in which the seal 112 is arranged. Movement between the plunger 25 and the power operated sleeves 20 and 81 is so slight that the seal 112 constitutes a "live" seal which will last over long periods of operation of the device.

The outer sleeve 81 projects substantially beyond the sleeve 20 and seal 112 and extends preferably wholly through the inner lip of the seal 103 when the parts are in the "off" position shown in Figure 2. This projecting portion of the sleeve 81 is provided with openings 115 communicating, when the parts are in the "off" positions shown, with an annular groove 116 formed in the bearing 80 and communicating, in turn, with the passage 92. The projecting portion 111 of the spring seat 110 is apertured as at 117, and it will be apparent that liquid may flow from the reservoir through passage 92, groove 116, and openings 115 and 117 into the high pressure cylinder to replenish any leakage fluid after the parts have returned to normal positions and to provide for the return to the reservoir of any excess liquid in the high pressure cylinder, as further explained below.

The seal 112 is quite efficient in preventing leakage to the right around the plunger 25. To further insure against such leakage, however, an O-ring 120 is arranged in an annular groove 121 in the rod 25. Because of the slight movement between the rod 25 and the sleeve 20, the O-ring 120 will always remain well within the longitudinal limits of the bearing 82. A similar O-ring 122 may be used to insure against leakage past the outer surface of the bearing 80.

The form of the invention described above is highly efficient in operation, and it will be apparent that the ratio of the work performed by the foot of the operator to that performed by the booster motor will be the ratio between the end of the foot-operated plunger 25 and the area of the motor driven sleeve structure including the sleeves 20 and 81. According to the individual ideas of manufacturers and the individual characteristics of brake systems of this character, it may be desired to have the operator perform a different ratio of the total work involved in displacing fluid from the high pressure chamber. This, of course, would require a different designing of the parts in accordance with the brake mechanism described above. However, in Figures 4 and 5 of the drawings I have shown modifications of the plunger structure whereby the replacement of relatively minor elements without redesigning any of the main parts of the apparatus will provide for different work performing ratios.

In the form of the invention previously described, the plunger 25 projects entirely through the sleeve 20 to directly displace fluid from the high pressure chamber, and the sleeve 81 is of uniform thickness from end to end. In Figure 4 there is shown a plunger 125 which is substituted for the plunger 25, and the sleeve 20 is replaced by a sleeve 126, which is somewhat shorter than the sleeve 20 and is free from the plunger 125 and spaced therefrom as at 127, which space takes the place of the annular space 83, the bearing portion 82 of the power operated sleeve being omitted. In place of the sleeve 81 there is provided a surrounding sleeve 128 slipped over the sleeve 126 and extending to the right end thereof in the same manner as the sleeve 81 as shown in Figure 1. The sleeves 126 and 128 constitute a sleeve structure.

The sleeve 128 in Figure 4 has an external diameter corresponding to that of the sleeve 81, so that the structure of Figure 4 is interchangeable with that shown in Figure 2, no different bearing 80 and its associated seals being required. Beyond the left end of the sleeve 126, the sleeve 128 is provided with a thickened portion 129 forming an internal bore 130 which is of larger diameter than the bore of the sleeve 126. A plunger head 131 is mounted in the bore 130 and receives a projecting reduced head 132 formed on the rod 125. Obviously, the rod 125 effects movement of the head 131 and this head becomes a foot-operated plunger and is of an area greater than the plunger 25 of Figure 2, hence the ratio of foot-generated work will be greater.

The head 131 and sleeve 126 are sealed with respect to the surrounding sleeve by O-rings 135 and 136 to prevent leakage of fluid. Against the left end of the head 131 is arranged a cup seal 138, and spaced to the left of this seal the sleeve portion 129 is radially apertured, as at 139, for the same purpose as the apertures 115 in Figure 2. A spring seat 140, corresponding to the seat 110, engages the end of the sleeve portion 129 and has an inwardly projecting frusto-conical portion 141 apertured as at 142 for the passage of fluid. The seat 140 is provided with an axial stud 143 the inner end of which is spaced from the seal 138 to prevent material displacement thereof to the left in Figure 4. It will become apparent that there is very little relative axial sliding movement between the head 131 and sleeve portion 129. Accordingly, there is very little wear on the seal 138, and this seal actually never will move to the left, except under unusual conditions, to engage the stud 143.

The form of the invention shown in Figure 5 is very similar to that shown in Figure 4, and identical parts are indicated by the same reference numerals. In Figure 5 the head 131 is shown as being provided with a headed stud 145 surrounded by a double-lipped seal 146, which is substituted for the seal 138. The head of the stud 145 prevents longitudinal displacement of the seal 146, in which case the stud 143 of Figure 4 need not be used and the inner extremity of the spring seat 140 is closed, as at 147, and such portion of the spring seat is slightly spaced from the head of the stud 145.

*Operation*

All of the parts normally ocupy the "off" positions shown in Figures 1 and 2. The motor 10 will be vacuum suspended, as stated above, the motor chamber 16 communicating, through the various passages and spaces described above, with the motor chamber 15.

When the brakes are to be applied, the conventional brake pedal (not shown) is operated to effect movement of the rod 73 to the left to move the plunger 44 and sleeve 51 to the left. The valve seat 50 moves toward the left, followed by the valve element 49 and associated elements under the influence of the spring 48. Slight movement of the parts brings the valve element 49 into engagement with the seat 53, whereupon communication between the chambers 15 and 16 will be cut off. Further slight movement of the manually operated parts to the left moves the seat 50 away from the valve element 49, whereupon air flows around this valve seat and through passage 56 into the chamber 15 to actuate the motor. The valve mechanism described provides a follow-up action of the pressure responsive unit of the motor with the manually operable parts, it being apparent that the plunger 25 is moved with the plunger 51 when the latter is manually operated. Whenever the movement of the brake pedal is stopped, the valve parts reach approximately a lap position, whereupon movement of the parts is arrested. Releasing of the brake pedal moves the valve seat 50 into engagement with the valve element 49 and then carries this valve element away from the seat 53, whereupon air will be exhausted from the motor chamber 15 into the chamber 16 as the parts return to normal "off" positions.

The present invention is particularly directed to the mechanism shown in detail in Figure 2. As the plunger 25 and sleeve 20 move toward the left upon a brake pedal operation, fluid will be displaced from the high pressure cylinder 21 to the brake cylinders to apply the brakes. Very slight movement takes place between the plunger 25 and sleeve 20 and its surrounding sleeve 81, and this movement can be taken up by slight deformation of the seal 112 with practically no movement of the radially inner and outer surfaces of this seal against the surfaces of the plunger 25 and sleeve 81. The seal 112 is thus highly effective, and is capable of extremely long life.

The use of the seal 112 in the manner described is permitted because of the use of the sleeve 81 and its projection substantially beyond the left-hand end of the sleeve 20. Obviously, the surrounding sleeve 81 need not be employed and it may be considered to be integral, with such sleeve provided with a longitudinally projecting portion forming the pocket to receive the seal 112. The use of a separate sleeve 81 is preferred, however, since a sleeve of this character formed of stainless steel reduces friction and wear on the seals 103, 97, and 98.

After the brakes have been applied, the operator may suddenly release the brake pedal and, due to the resistance to return flow of liquid from the brake lines caused by the residual pressure valve 23, the pressure in the high pressure cylinder may drop below that of the atmosphere, thus tending to suck air into the high pressure chamber. When the pressure in the cylinder 21 drops to such extent, atmospheric pressure behind the washer 107 will effect movement of this washer to the left and fluid will flow around the outer lip of the seal 103 and through openings 106 into the high pressure cylinder to prevent an undue drop in pressure. This operation also insures an adequate supply of liquid in the cylinder 21 if the operator should partially release the brake pedal and then re-apply it without permitting the parts to return to the fully "off" positions. Thus, the present device is highly advantageous in the use of the seal 103.

The sleeve 81 projects substantially beyond the seal 112, and the openings 115 always lie beyond the seal 112, and come into communication with the annular groove 116 whenever the parts return to the normal positions shown in Figure 2. Under such conditions the reservoir is in direct communication with the interior of the cylinder 21 through passage 92, groove 116, and openings 115 and 117. Any loss of liquid from the cylinder 21 due to leakage, accordingly, will be replenished. Moreover, if more than the normal amount of liquid has been admitted to the cylinder 21 by seepage of liquid around the outer lip of the seal 103 in the manner described above, there will be an excess amount of liquid in the system which could prevent the brake shoes from returning to their fully "off" positions. However, the present construction takes care of this situation since, if any excess fluid is present in the system, it can freely flow from the cylinder 21 back into the reservoir 90 when the parts reach the fully "off" positions shown in Figure 2 through openings 117 and 115, groove 116 and passage 92.

The provision of the annular space 83 in communication with the atmosphere minimizes differential pressures between the cylinder 21 and the space around the plunger 25. Thus, the leakage of fluid around the plunger 25 away from the cylinder 21 is prevented.

The present construction renders highly feasible the use of the cylinder 21 as a master cylinder having a reservoir associated therewith. Leakage fluid can be replenished; drops in pressure in the high pressure cylinder to an excessive degree are prevented; the use of a "live" seal 112 substantially without surface friction is permitted, and leakage from the high pressure cylinder around the manually operated plunger 25 is prevented. The present construction, accordingly, is highly advantageous over prior devices of this type.

The forms of the invention shown in Figures 4 and 5 operate in exactly the same manner as the form previously described and need not be referred to in detail. The thickened portion 129 of the sleeve 128 may be of any desired internal diameter to accommodate a head 131 of the desired size, in accordance with the ratio which it is desired to provide between the work performed by the operator and by the booster motor. It will be apparent that the main sleeve 126, the plunger 125, and all other parts of the apparatus may be retained and may be used with heads 131 and sleeves 128 having sleeve portions 129 of an internal diameter to fit whatever head 131 is selected, thus rendering the apparatus as a whole adaptable for different installations where different ratios of manual and booster motor forces are desired.

The sleeve portion 129 also performs the function of the bearing portion 82 of the sleeve 20, and the space 127 performs the function of an annular space 83 in that it provides for atmospheric pressure back of the sleeve portion 129 to assist the O-ring 135 in preventing leakage. As in the previous case, the extremely slight relative movement between the head 131 and sleeve portion 129 results in limiting distortion of and wear on the seal 138 (Figure 4) or 146 (Figure 5). Either of the modified forms of the invention, therefore, provides the apparatus as a whole with a much higher degree of flexibility for use in different brake installations.

I claim:

1. A brake mechanism comprising a hydraulic fluid chamber having an outlet for connection with a brake line, and means movable into said chamber to displace fluid therefrom, said means comprising a plunger, a sleeve surrounding said plunger, said sleeve and said plunger being slidable relative to each other and movable into said pressure chamber, said sleeve having a portion extending longitudinally beyond the end of said plunger adjacent said fluid chamber and having an internal diameter greater than the external diameter of said plunger, said sleeve at a point spaced from the end of said plunger away from said chamber having an internal shoulder, and said shoulder, said plunger and said extending portion of said sleeve cooperating to form an annular pocket, and a double-lipped flexible seal seated against said shoulder and having the lips thereof respectively engaging the inner surface of said extending portion of said sleeve and the outer surface of said plunger.

2. A mechanism constructed in accordance with claim 1, wherein said extending portion of said sleeve which extends beyond the end of said plunger in the direction of said chamber has an aperture therethrough communicating with said chamber, and means for supplying hydraulic fluid to said aperture.

3. A mechanism constructed in accordance with claim 1, wherein said extending portion of said sleeve which extends beyond the end of said plunger in the direction of said chamber has an aperture therethrough communicating with said chamber, said chamber having a bearing in which said sleeve is axially movable and having fluid passage means communicating with said aperture when said fluid displacing means is in a normal "off" position, and a reservoir communicating with said fluid passage means.

4. A brake mechanism comprising a hydraulic fluid chamber having an outlet for connection with a brake line, and means movable into said chamber to displace fluid therefrom, said means comprising a plunger and a sleeve structure surrounding said plunger and slidable thereon, such structure comprising an inner sleeve surrounding said plunger and having its end toward said chamber terminating short of the corresponding end of said plunger, said structure further comprising an outer sleeve surrounding and fixed with respect to said inner sleeve and projecting beyond said plunger in the direction of said chamber, said plunger, said end of said first sleeve, and said outer sleeve forming an annular pocket, and a flexible seal arranged in said pocket, said seal engaging said end of said inner sleeve and having radially inner and outer surfaces respectively engaging the inner surface of said outer sleeve and the outer surface of said plunger.

5. A mechanism constructed in accordance with claim 4 wherein said outer sleeve beyond said seal in the direction of said chamber is provided with an aperture, and means for supplying brake liquid to said aperture when said fluid displacing means is in a normal "off" position.

6. A mechanism constructed in accordance with claim 4 wherein said outer sleeve beyond said seal in the direction of said chamber is provided with an aperture, a bearing carried by said chamber and in which said outer sleeve is axially movable, said bearing being provided with a liquid passage communicating with said aperture when said fluid displacing means is in a normal "off" position, and a liquid reservoir communicating with said passage.

7. A brake mechanism comprising a fluid chamber having an outlet for communication with a brake line, fluid displacing means movable into said chamber to displace fluid therefrom, such means comprising a plunger, a sleeve structure surrounding said plunger, said sleeve structure having a bearing for said plunger terminating in a shoulder spaced from the end of said plunger adjacent said chamber, said sleeve structure having a cylindrical portion projecting from said shoulder in the direction of said end of said plunger, said plunger, said shoulder and the cylindrical portion of said sleeve structure forming an annular pocket, and a flexible seal arranged in said pocket against said shoulder and engaging the inner surface of the cylindrical portion of said sleeve structure and the outer surface of said plunger.

8. A mechanism constructed in accordance with claim 7, wherein the cylindrical portion of said sleeve structure projects beyond said seal in the direction of said chamber and is provided therethrough with an aperture communicating with said chamber, and means for supplying brake liquid to said aperture when said fluid displacing means is in a normal "off" position retracted from said chamber.

9. A mechanism constructed in accordance with claim 7, wherein the cylindrical portion of said sleeve structure projects beyond said seal in the direction of said chamber and is provided therethrough with an aperture communicating with said chamber, a bearing adjacent said chamber in which said sleeve structure is axially movable, said bearing being provided with a passage communicating with said aperture when said fluid displacing means is its normal "off" position, and a reservoir communicating with said passage.

10. A mechanism constructed in accordance with claim 7, wherein the cylindrical portion of said sleeve structure projects beyond said seal in the direction of said chamber and is provided therethrough with an aperture communicating with said chamber, a bearing adjacent said chamber in which said sleeve structure is axially movable, said bearing being provided with a passage communicating with said aperture when said fluid displacing means is in its normal "off" position, a reservoir communicating with said passage, said last-named bearing at the end thereof adjacent said chamber having an annular recess, and a double-lipped seal in said recess having an inner lip in which said sleeve structure is slidable and an outer lip engaging a surface of said recess, said recess having a base portion communicating with said passage whereby, when pressure in said passage exceeds pressure in said chamber, fluid will flow from said passage around a lip of said last-named seal and into said chamber.

11. A hydraulic brake mechanism comprising a fluid chamber having an outlet for connection with a brake line, a bearing supported adjacent said chamber, fluid displacing means longitudinally slidable in said bearing in one direction to displace fluid from said chamber and retractable in the opposite direction to a normal "off" position, said bearing at the end thereof toward said chamber having an annular recess, a double-lipped deformable seal in said recess having an inner lip in which said fluid displacing means is slidable and an outer lip engaging a wall of said recess, said bearing having a fluid passage communicating with said recess, a liquid reservoir communicating with said passage, and means tending to seat said seal in said recess to normally prevent the flow of liquid from said passage around said seal into said chamber, said seal being deformable when pressure in said chamber drops below the pressure in said passage, whereby fluid in the latter will flow around a lip of said seal into said chamber.

12. A hydraulic brake mechanism constructed in accordance with claim 11 wherein said fluid displacing means comprises a plunger, a sleeve structure surrounding said plunger, said sleeve structure having a cylindrical portion extending longitudinally beyond the end of said plunger adjacent said chamber to form an annular pocket, and a deformable double-lipped seal in said pocket having an inner lip engaging said plunger and an outer lip engaging the inner surface of said cylindrical portion of said sleeve structure, such cylindrical portion extending beyond said last-named seal in the direction of said chamber and having an opening therethrough communicating with said chamber and communicating with the passage in said bearing when said fluid displacing means is in its normal "off" position.

13. A brake mechanism comprising a hydraulic fluid chamber having an outlet for connection with a brake line, and means movable into said chamber to displace fluid therefrom, said means comprising a plunger and a sleeve structure surrounding said plunger and slidable relative thereto, said structure comprising an inner sleeve surrounding said plunger and having its end toward said chamber terminating short of the corresponding end of said plunger, said structure further comprising an outer sleeve tightly surrounding said inner sleeve and projecting beyond said plunger in the direction of said chamber, and a flexible seal in the projecting end of said outer sleeve and engaging said outer sleeve and said plunger.

14. A mechanism constructed in accordance with claim 13 wherein said outer sleeve beyond said seal in the direction of said chamber is provided with an aperture therethrough, and means for supplying brake fluid to said aperture when said fluid displacing means is in a predetermined normal "off" position.

15. A mechanism constructed in accordance with claim 13 wherein said outer sleeve beyond said seal in the direction of said chamber is provided with an aperture therethrough, a bearing in which said outer sleeve is axially movable, said bearing being provided with a liquid passage communicating with said aperture when said fluid displacing means is in a normal "off" position, and a liquid reservoir communicating with said liquid passage.

16. A brake mechanism comprising a hydraulic fluid chamber having an outlet for connection with a brake line, and means movable into said chamber to displace fluid therefrom, said means comprising a plunger and a demountable head carried thereby, an inner sleeve surrounding said plunger and terminating short of said head, an outer sleeve having a portion surrounding said inner sleeve and having a portion projecting substantially beyond said inner sleeve and beyond said head in the direction of said chamber and slidably receiving said head, and a flexible seal arranged between said head and the projecting portion of said outer sleeve.

17. A mechanism constructed in accordance with claim 16 wherein the projecting portion of said outer sleeve beyond said seal in the direction of said chamber is provided therethrough with an aperture communicating with said chamber, and means for connecting said aperture with a source of brake fluid supply when said fluid displacing means is in a normal "off" position.

References Cited in the file of this patent

UNITED STATES PATENTS

| | | |
|---|---|---|
| 2,006,487 | Sorensen | July 2, 1935 |
| 2,078,209 | Sanford et al. | Apr. 20, 1937 |
| 2,185,264 | Mistral | Jan. 2, 1940 |
| 2,241,112 | Bowen | May 6, 1941 |
| 2,260,491 | Stelzer | Oct. 28, 1941 |
| 2,282,556 | Bowen | May 12, 1942 |
| 2,336,374 | Stelzer | Dec. 7, 1943 |